Feb. 7, 1928. 1,658,279

A. W. BARTON ET AL

VARIABLE SPEED DRIVING MECHANISM

Filed Jan. 15, 1926    2 Sheets-Sheet 1

Inventors:
A. W. Barton.
E. DuLac.
E. M. Ferguson.
By Whiteley and Ruckman
Attorneys.

Feb. 7, 1928.
A. W. BARTON ET AL
1,658,279
VARIABLE SPEED DRIVING MECHANISM
Filed Jan. 15, 1926   2 Sheets-Sheet 2
Fig-3
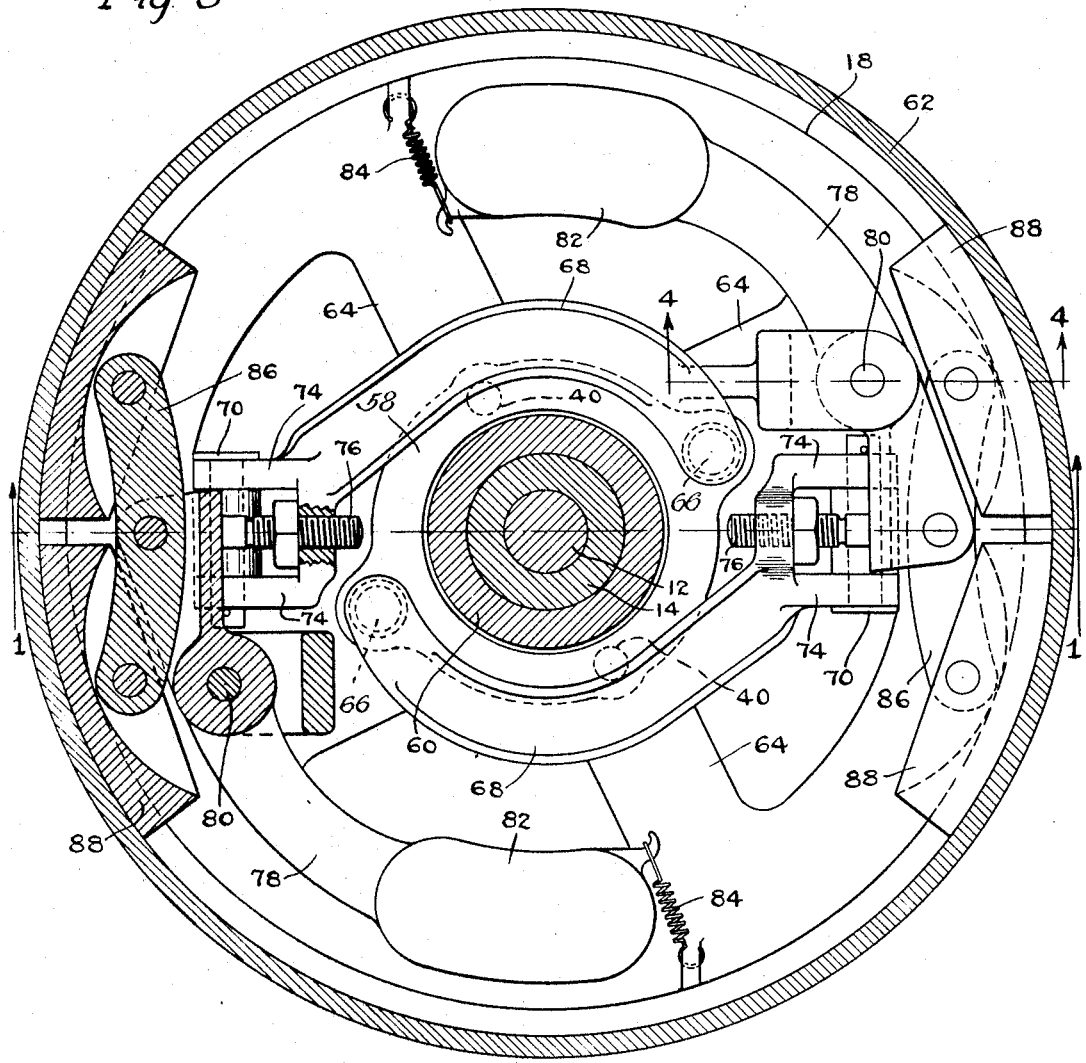
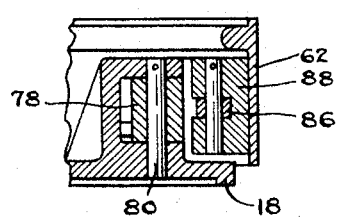
Fig-4
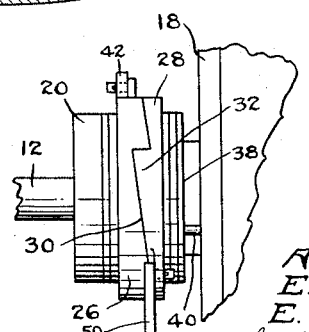
Fig-5
Inventors:
A. W. Barton.
E. DuLac.
E. M. Ferguson.
By Whiteley and Ruckman
Attorneys.

Patented Feb. 7, 1928.

1,658,279

UNITED STATES PATENT OFFICE.

ALBERT W. BARTON, EDMUND DU LAC, AND EDWIN M. FERGUSON, OF MINNEAPOLIS, MINNESOTA, ASSIGNORS TO HORTON MFG. COMPANY, OF MINNEAPOLIS, MINNESOTA.

VARIABLE-SPEED DRIVING MECHANISM.

Application filed January 15, 1926. Serial No. 81,401.

Our invention relates to variable speed driving mechanism, and an object in general is to provide mechanism by means of which machines of various kinds may be driven from a pulley at speeds which may be varied as desired. Another object is to provide a pulley of this character having mechanism associated therewith which acts as a governor so that in case the pulley should from any cause become speeded-up excessively, the shaft driven from the pulley will not also be speeded up. This invention is an improvement on that disclosed in Patent No. 1,171,554, issued Feb. 15, 1916, to Charles P. Strite. An object in particular is to provide mechanism of this nature which is more sensitive and reliable in operation than that disclosed in said patent.

The full objects and advantages of our invention will appear in connection with the detailed description thereof, and the novel features of our inventive idea will be particularly pointed out in the claims.

In the accompanying drawings which illustrate a practical embodiment of our invention,—

Figure 1:
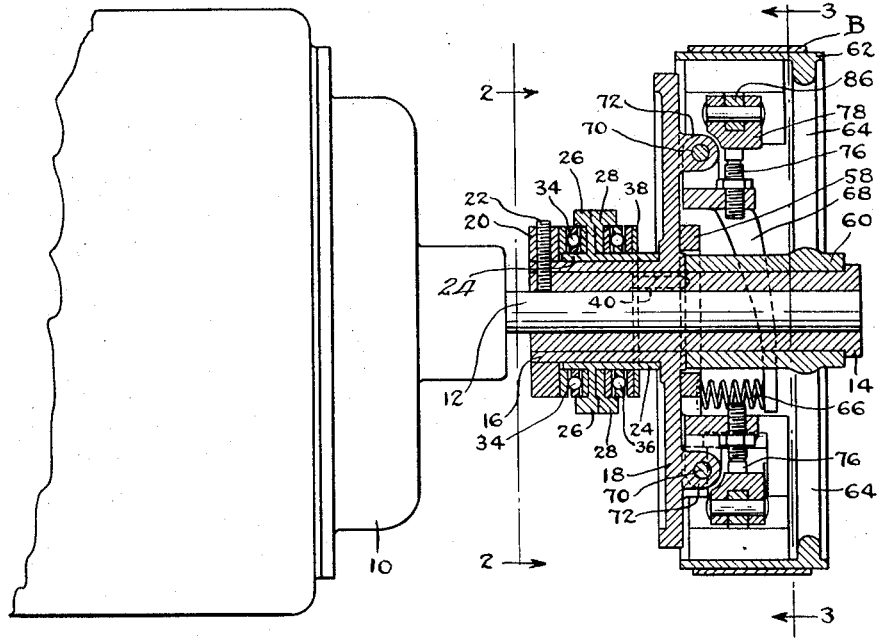
Figure 2:
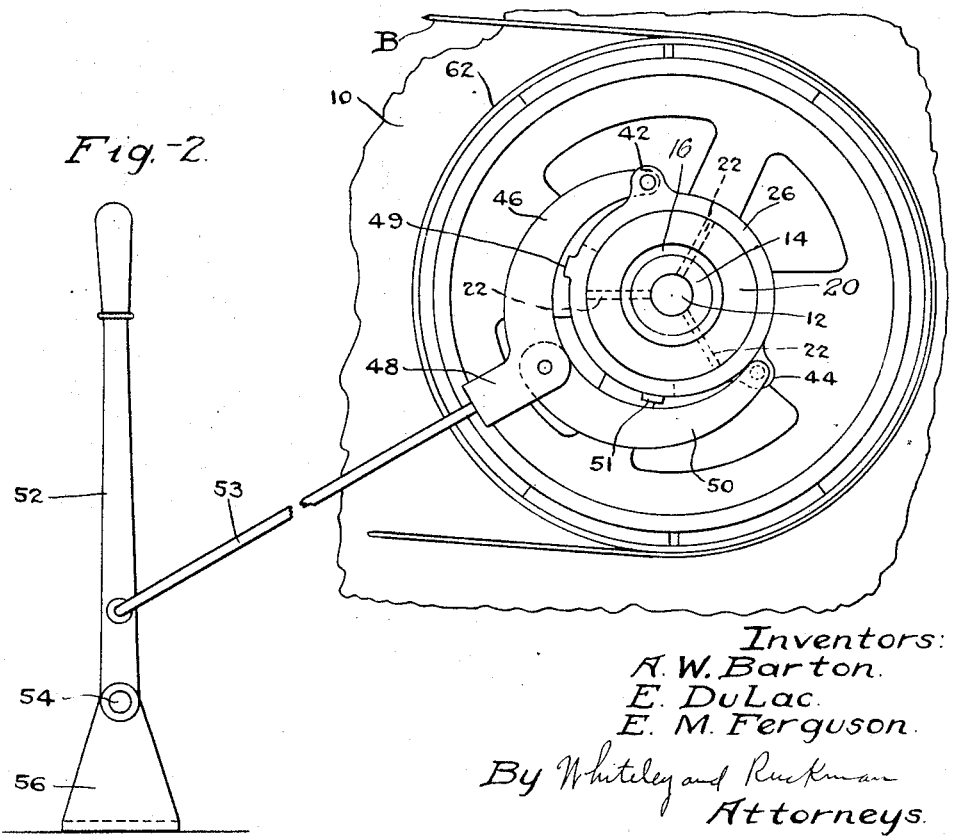

Fig. 1 is a vertical sectional view of the mechanism. Fig. 2 is a view taken on the line 2—2 of Fig. 1. Fig. 3 is a view on an enlarged scale in section on the line 3—3 of Fig. 1 and turned through 90°. Fig. 4 is a view in section on the line 4—4 of Fig. 3. Fig. 5 is a detail view.

As illustrated in the drawings, a machine 10 which is to be operated has a shaft 12 which extends outwardly therefrom. A sleeve 14 surrounds the shaft 12, the inner end portion of this sleeve being surrounded by a hub 16 which extends out from a transmission disk or spider 18. A collar 20 surrounds the inner end of the hub 16. Three set screws 22 which pass through the collar 20, the hub 16 and the sleeve 14 serve to secure them to each other and to the shaft 12. A sleeve 24 is mounted for oscillatory movement around the hub 16 while a ring 26 is secured to said sleeve. A second ring 28 is mounted for oscillatory movement on the sleeve 24. The adjacent sides of these two rings have cooperating cam surfaces 30 and 32 respectively, there preferably being three of these cam surfaces around each of the rings. Ball bearings 34 with their retainers and spacing rings are interposed between the collar 20 and the ring 26, while ball bearings 36 with their retainers and spacing rings are interposed between the ring 28 and a ring 38. This latter ring has two pins 40 extending from the outer face thereof. These pins are located at diametrically opposite points and one of them is shown in Fig. 5 and one of them is shown in dotted lines in Fig. 1. These pins project through openings in the disk 18 for a purpose which will presently appear. As best shown in Fig. 2, the ring 26 is provided with an outwardly directed ear 42 and the ring 28 is provided with an outwardly directed ear 44. A curved arm 46 is pivoted at one end to the ear 42 and its other end is turned outwardly to form a socket member 48. A second curved arm 50 is pivoted at one end to the ear 44 and at its other end is pivoted to the base of the socket member 48. When the socket member 48 is pulled outwardly, the rings 26 and 28 will be partially rotated in relatively opposite directions and the cam surfaces 30 and 32 will cooperate to cause separation of the rings 26 and 28 which results in an outward shifting movement of the ring 38. When the socket member 48 is pushed inwardly, the rings 26 and 28 will be partially rotated in relatively opposite directions and in directions opposite to their former movements, thus permitting the rings to come together and also permitting inward shifting movement of the ring 38. Stop lugs 49 and 51 carried by the rings 26 and 28 will engage each other and determine the extent of turning movement of the rings when the socket member is pulled outwardly as will be understood from Fig. 2. The socket member may be operated in any suitable manner. As shown in Fig. 2, the socket member is connected by a rod 53 with a hand lever 52 which can be turned on a pivot 54 carried by its lower end and by a floor bracket 56. Referring again to the ring 38, it will be understood from Fig. 1 that the pins 40 which are carried by this ring after passing through the disk 18 engage an equalizing ring 58 and that the disk 18 is adjacent the inner end of the hub 60 of a pulley rim 62 connected by spokes 64 with said hub which is rotatably mounted on the sleeve 14. At diametrically opposite points on the ring 58, coiled springs 66 are interposed between this ring and the free ends of two curved lever arms 68. As best shown in Fig. 3, the two arms 68 are pivoted at diametrically opposite places upon bolts 70 which pass through lugs 72 carried on the inner surface of the disk 18 and which also pass through pairs of spaced lugs 74. The lever arms 68 between the lugs 74 thereon carry adjustable set bolts 76, the heads of which engage levers 78 pivoted near one of their ends on pivots 80 carried by the disk 18. The long arms of the levers 78 have weights 82 at their ends and are urged outwardly by springs 84 which connect them with the disk 18. Centrally pivoted on the short arms of the levers 78 are equalizing arms 86 upon the ends of which pairs of shoes or friction blocks 88 are pivotally mounted. Under ordinary conditions, the springs 84 hold the shoes 88 out of operating engagement with the inner surface of the pulley rim 62 so that the pulley runs free on the sleeve 14 and does not impart rotation to the shaft 12. If, however, the spanner consisting of the curved arms 46 and 50 is pulled outwardly, this will result in the cam surfaces 30 and 32 riding upon each other and will cause the pins 40 to move forwardly and rock the arms 78 thereby forcing the shoes 88 into engagement with the pulley rim 62. The frictional engagement of these shoes will cause the disk 18 and the shaft 12 to which it is secured to rotate. It will be understood that when the rings 26 and 28 are close together in the position shown in Fig. 5, no movement will be imparted from the pulley to the shaft 12.

The operation and advantages of our invention will be readily understood in connection with the foregoing description. Upon pulling outwardly the spanner consisting of the arms 46 and 50, pressure will be gradually applied to the springs 66 to force the shoes 88 into engagement with the pulley rim 62, for imparting rotation therefrom to the shaft 12 so that the latter will be started slowly. If the spanner is pulled outwardly to its full extent as determined by the stop lugs, the speed of the shaft 12 will under ordinary conditions be accelerated until is reaches the speed of the pulley. By pulling the spanner only part way outward, any desired speed of the shaft 12 less than that of the pulley may be obtained. Furthermore, the mechanism will act as a governor since if the belt B which drives the pulley becomes speeded up more than the desired amount, centrifugal force will cause the weights 82 to move outwardly and partly disengage the shoes from the pulley rim, thereby preventing speeding up of the shaft 12. It will be apparent from Figs. 1 and 2 that the variable speed mechanism is made operable without any means for attaching it to the frame of the machine which is to be operated and that it can be applied to short stub shafts. It will also be apparent from Fig. 1 that end thrust is avoided. The use of a spanner for rotating two cam devices in opposite directions and the mounting of the cam devices and thrust ball bearings on the hub of the transmission disk results in an extremely reliable operation of the mechanism. The employment of the sleeve 14 and the surrounding sleeve 24 with which one of the cam devices is rigidly connected prevents cutting of the hub 16 to which the transmission disk is connected. The employment of relatively long lever arms 68 results in increased leverage and makes it possible to use weaker springs, thereby making the mechanism more sensitive and reducing fluctuations in transmission. The provision of the equalizer ring 58 backed up by springs 66 and the provision of the ring 38 carrying the pins 40 eliminates the long pins 31 and 32 and the thick casting 23 shown in patent No. 1,171,554 previously referred to. The making of the friction shoes in two parts or in pairs connected by the equalizing arms 86 provides for variations or inequalities in the inner surface of the pulley rim 62. This surface even if accurately machined will not remain accurate on account of expansion and contraction of the spokes 64 of the pulley. The ring 58 acts as an equalizer due to the fact that the pins 40 engage this ring midway between the places thereof engaged by the springs 66 as will be seen from Fig. 3.

We claim:

1. In combination with a shaft, a power operated pulley on said shaft, a transmission member on said shaft, an equalizing ring loosely surrounding said shaft, levers pivoted near their ends to said transmission member, weights on the long arms of said levers, springs normally urging said long arms outwardly, friction shoes carried by the short arms of said levers and normally held out of operative engagement with the rim of said pulley by said springs, means for operating said equalizing ring and connections between the latter and said short arms for forcing said shoes into engagement with said pulley rim.

2. In combination with a shaft, a power operated pulley on said shaft, a transmission member on said shaft, an equalizing ring loosely surrounding said shaft, a pair of lever arms pivoted to said transmission member, coiled springs interposed between said ring and the free ends of said lever arms, levers pivoted near their ends to said transmission member and having their short arms operatively engaged by said lever arms, weights on the long arms of said levers, springs normally urging said long arms outwardly, equalizing members centrally pivoted on the ends of said short arms, friction shoes pivoted on each of the ends of said equalizing members and normally held out of operative engagement with the rim of said pulley by said last mentioned springs, a pair of thrust bearings surrounding said shaft, means for sliding one of said thrust bearings to separate it from the other, a ring movable with said slidable bearing, and pins carried by said movable ring extending through said transmission member into engagement with said equalizing ring for forcing said shoes into engagement with said pulley rim.

3. In combination with a shaft, a power-operated pulley on said shaft, a transmission member on said shaft, an equalizing ring loosely surrounding said shaft on one side of said transmission member, a pair of lever arms pivoted to said transmission member, springs interposed between said ring and the free ends of said lever arms, friction shoes carried by said transmission member normally out of operative engagement with said pulley, connections between said lever arms and said shoes for forcing the latter into engagement with said pulley, a slidable member on the other side of said transmission member and within which said shaft is adapted to rotate, two pins carried by said slidable member extending through said transmission member into engagement with said equalizing ring midway between the places thereof engaged by said springs, and means for moving said slidable member toward said equalizing ring.

4. In combination with a shaft, a power-operated pulley on said shaft, a transmission member on said shaft, an equalizing ring loosely surrounding said shaft on one side of said transmission member, a pair of lever arms pivoted to said transmission member, springs interposed between said ring and the free ends of said lever arms, friction shoes carried by said transmission member normally out of operative engagement with said pulley, connections between said lever arms and said shoes for forcing the latter into engagement with said pulley, a movable member for sliding said equalizing ring and having engagement therewith midway between the places thereof engaged by said springs, and means for moving said movable member for operating said equalizing ring.

In testimony whereof we hereunto affix our signatures.

ALBERT W. BARTON.
EDMUND DU LAC.
EDWIN M. FERGUSON.